(12) United States Patent
Brouwer et al.

(10) Patent No.: US 6,779,610 B2
(45) Date of Patent: Aug. 24, 2004

(54) DEFECTIVE SOD REJECTOR AND DEFLECTOR

(75) Inventors: Gerardus J. Brouwer, Keswick (CA); Robert Milwain, Keswick (CA)

(73) Assignee: 1045929 Ontario Limited, Keswick (CA)

( * ) Notice: Subject to any disclaimer, the term of this patent is extended or adjusted under 35 U.S.C. 154(b) by 0 days.

(21) Appl. No.: 10/653,063

(22) Filed: Sep. 3, 2003

(65) Prior Publication Data

US 2004/0060713 A1 Apr. 1, 2004

Related U.S. Application Data

(60) Provisional application No. 60/410,002, filed on Sep. 12, 2002.

(51) Int. Cl.[7] .............................................. A01B 45/04
(52) U.S. Cl. ............................ 172/20; 172/33; 414/911
(58) Field of Search .............................. 172/19, 20, 33; 414/911; 111/901; 198/308.1

(56) References Cited

U.S. PATENT DOCUMENTS 4,109,729 A * 8/1978 Kaercher, Jr. .................. 172/1
4,944,352 A * 7/1990 Brouwer et al. ............... 172/19
4,966,239 A * 10/1990 Hutchison ..................... 172/20
5,230,602 A * 7/1993 Schouten .................. 414/789.7
5,950,407 A * 9/1999 Rosen .......................... 56/131
6,223,830 B1 * 5/2001 deVries ........................ 172/19
6,273,196 B1 * 8/2001 Van Vuuren .................. 172/20
6,364,027 B1 * 4/2002 Tvetene et al. ................. 172/1
6,659,189 B2 * 12/2003 Woerner et al. .............. 172/20
6,681,864 B2 * 1/2004 Tvetene et al. ............... 172/20

FOREIGN PATENT DOCUMENTS

EP 0 023 142 * 1/1981
EP 0 581 607 A * 2/1994

* cited by examiner

Primary Examiner—Victor Batson

(57) ABSTRACT

A sod harvester having a conveyor assembly to receive sod from a cutting head, a roll-up mechanism to form rolls from the cut sod, and a storage conveyor to receive a set of formed sod rolls, with a clamp to clamp the set of sod rolls and transfer it to a pallet. A diverter between the conveyor assembly and the storage conveyor normally allows sod rolls to travel to the storage conveyor but can be moved to create a gap through which defective sod rolls fall and are thereby rejected. A deflector located below the gap deflects scrap sod and defective sod rolls onto the cut portion of the sod field, rater than onto the uncut portion, so that the scrap sod deflected onto the field will not interfere with the next pass of the cutting head.

10 Claims, 12 Drawing Sheets

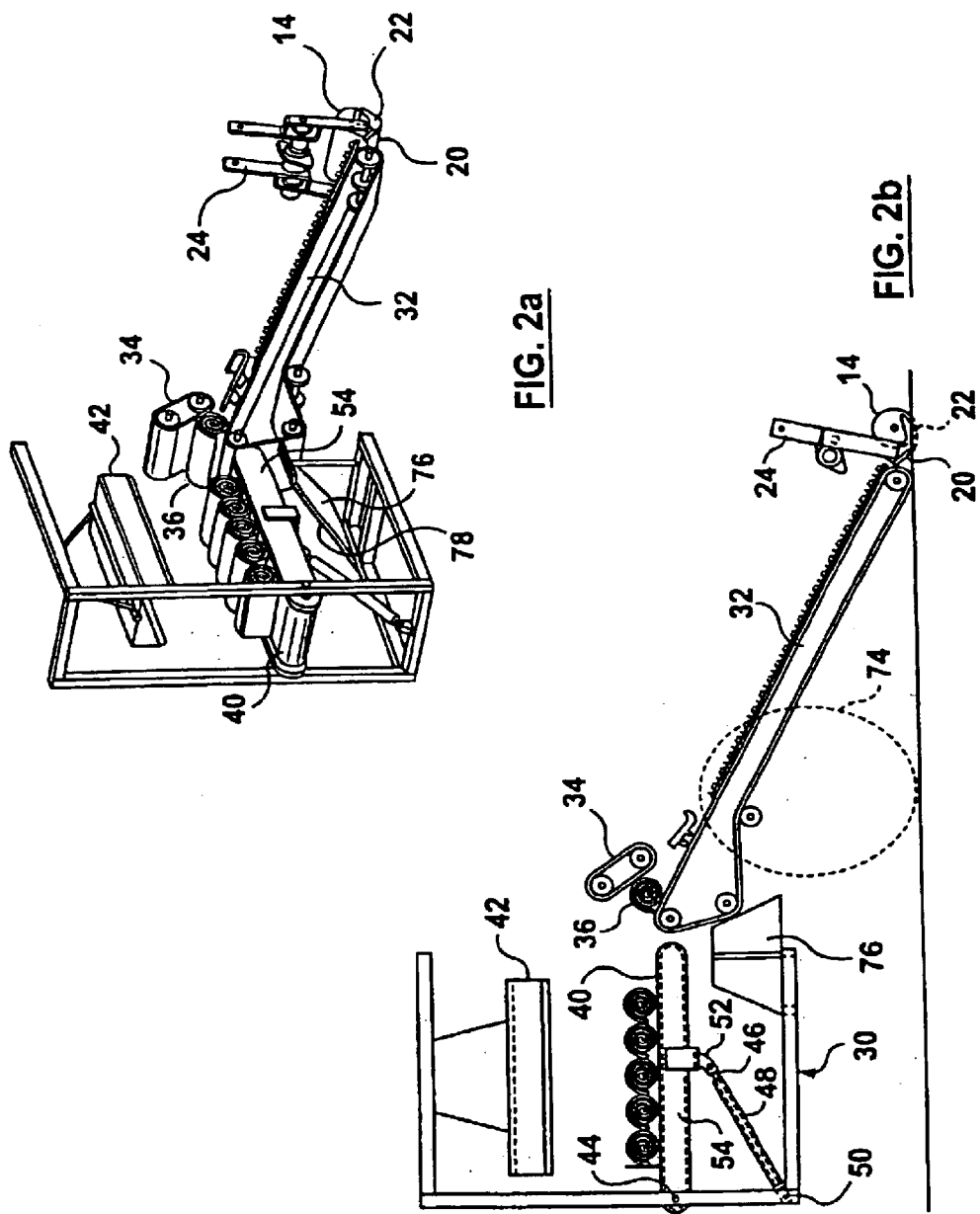

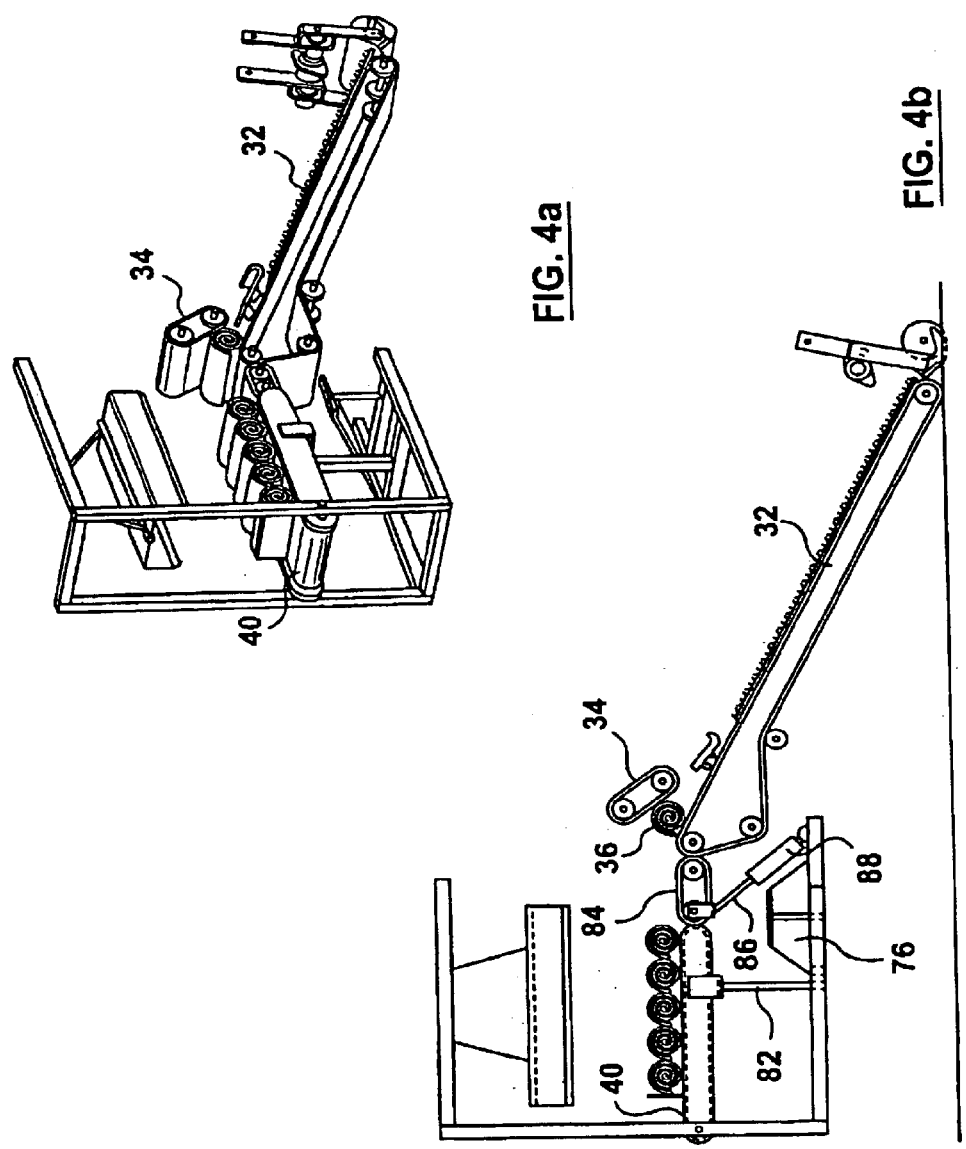

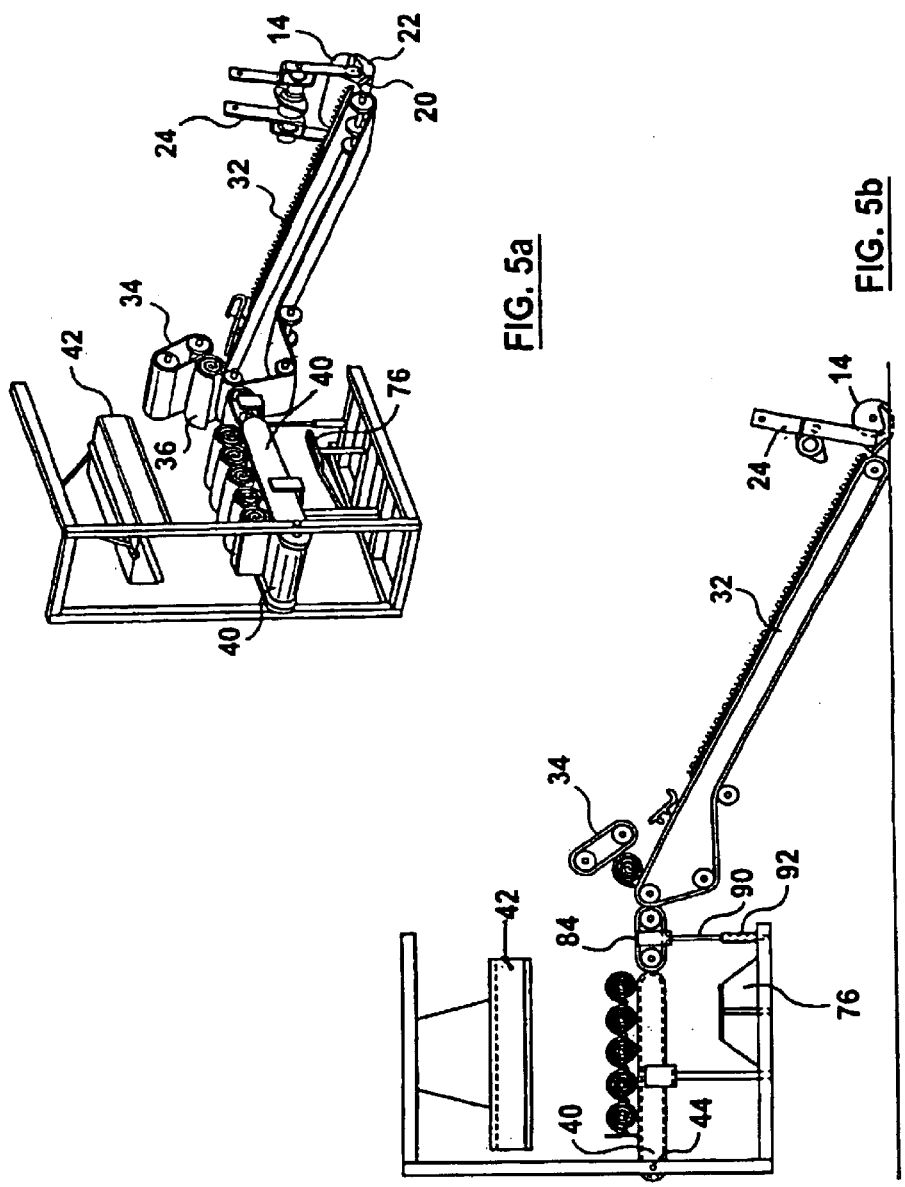

Figure 6C:
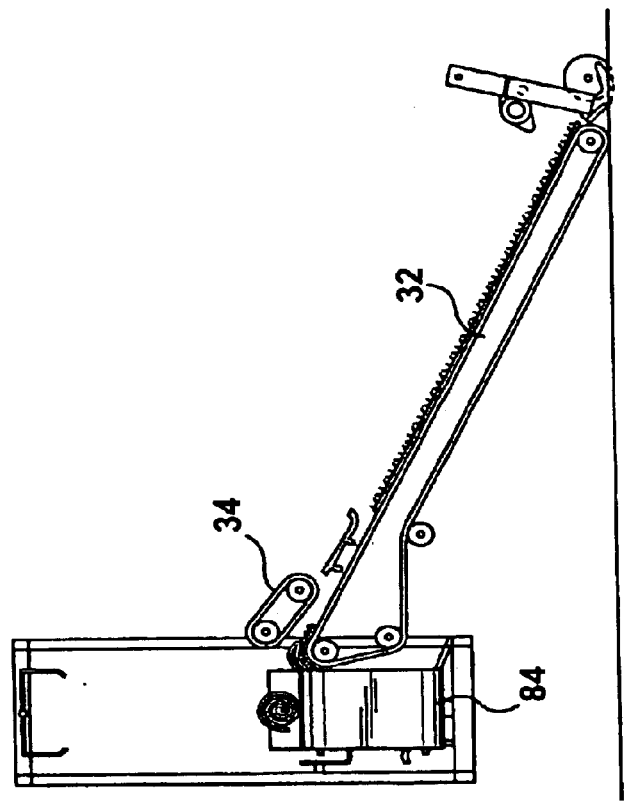
Figure 6D:
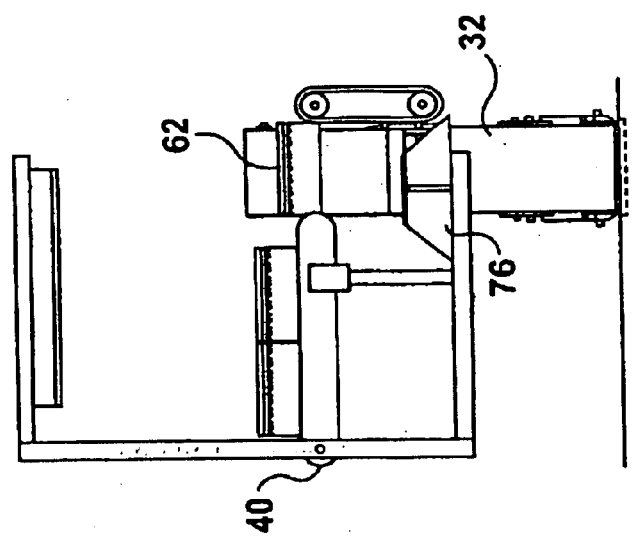
Figure 7A:
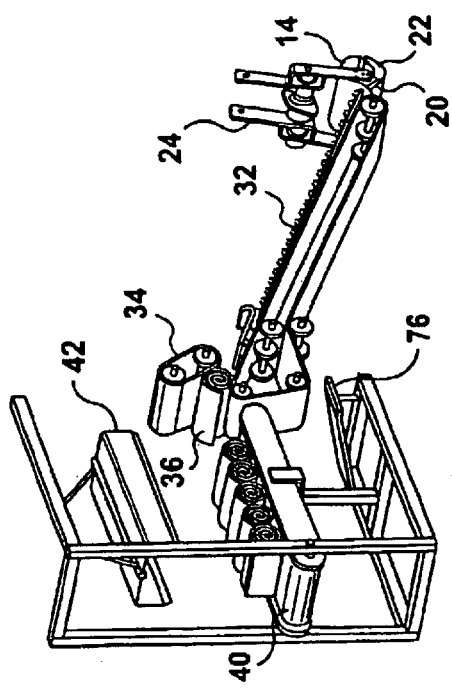
Figure 7B:
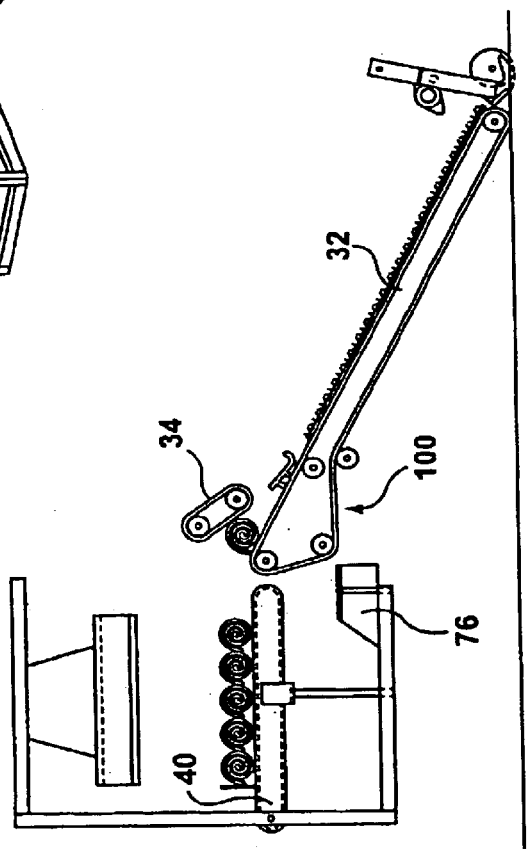

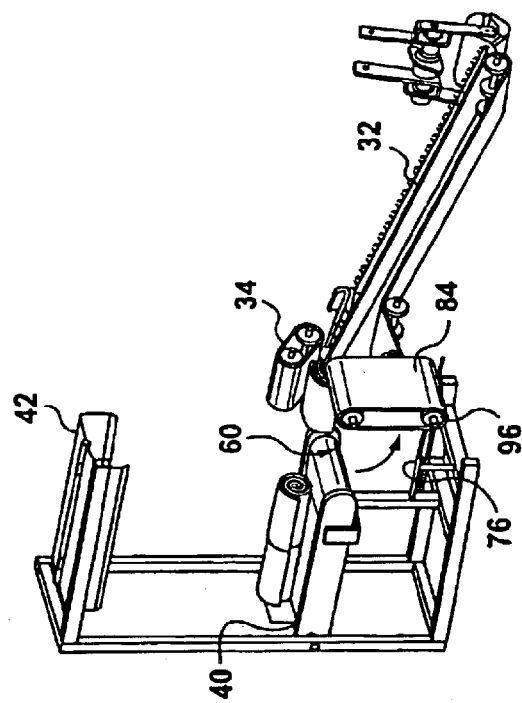
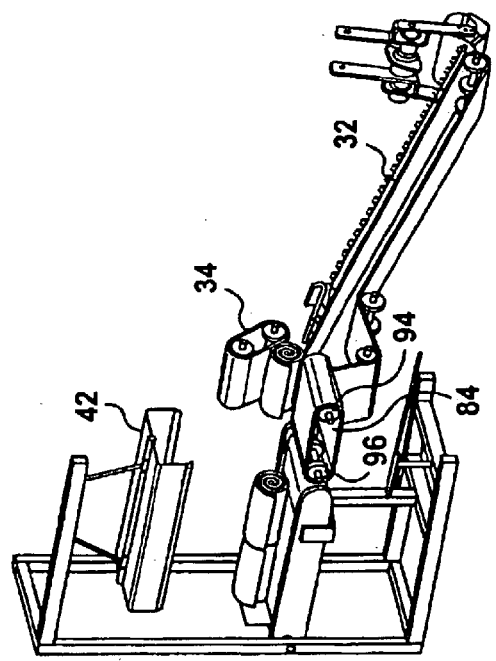
FIG. 6a
FIG. 6b

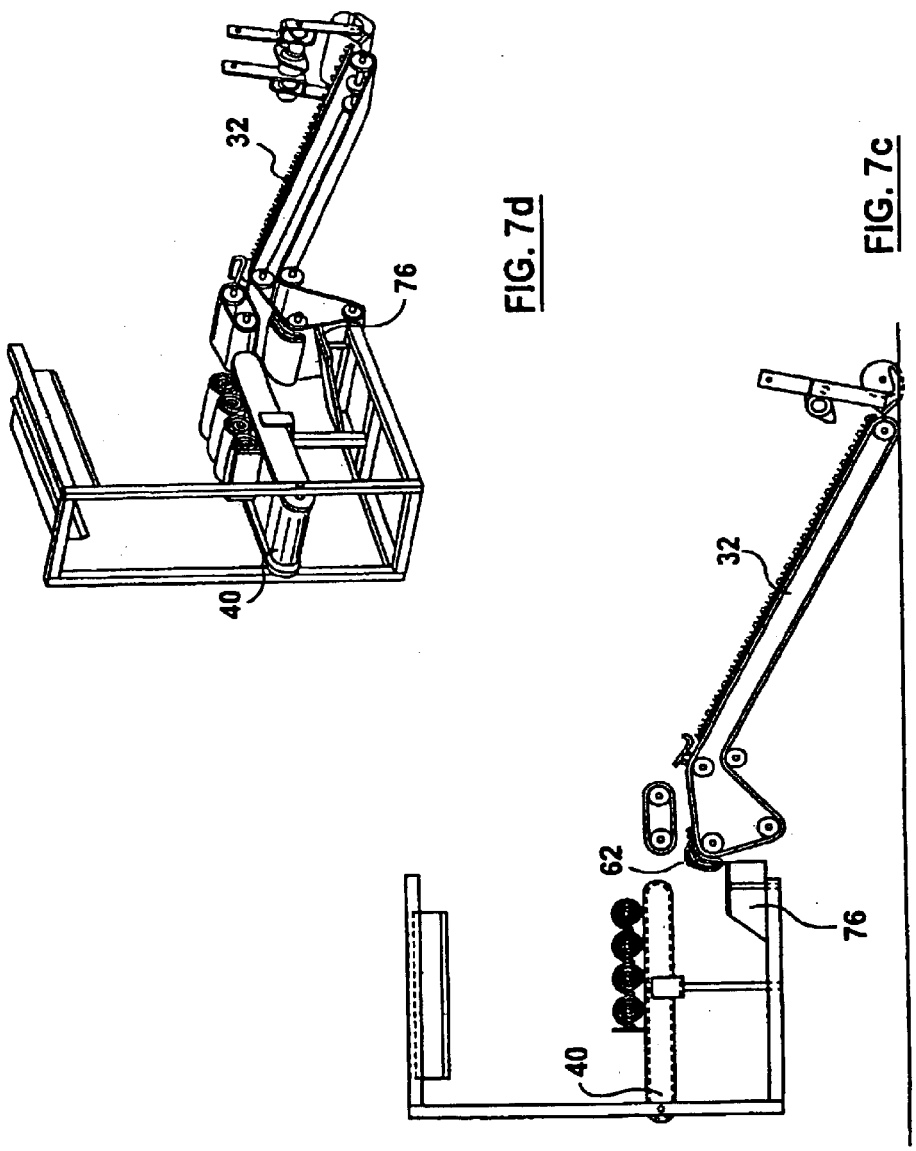

DEFECTIVE SOD REJECTOR AND DEFLECTOR

PRIOR APPLICATION

This application claims the benefit of U.S. Provisional Application Ser. No. 60/410,002, filed Sep. 12, 2002 entitled "DEFECTIVE SOD REJECTOR AND DEFLECTOR".

FIELD OF THE INVENTION

This invention relates to sod harvesters. More particularly, it relates to sod harvesters which cut strips of sod and form the cut strips into rolls.

BACKGROUND OF THE INVENTION

Automatic sod harvesters which cut a strip of sod from a field of sod, and then form the cut strip into discrete rolls of sod, have been well-known since the late 1960's. More recently, there has been a trend to providing mechanisms which can receive and store a number of sod rolls, and which can then transfer the stored rolls onto a pallet. An example of such a mechanism is shown in U.S. pat. No. 4,966,239 to Hutchison.

In sod harvesters which contain a storage area for a number of sod rolls, for transfer of the stored rolls to a pallet, it is important to reject defective sod rolls and pieces of scrap sod before they reach the storage area. If a defective sod roll or piece reaches the storage area, it typically abuts tightly against or may be sandwiched between other sod rolls, making the defective roll very difficult to remove at this stage. If the defective roll is transferred from the storage area to a pallet, it becomes even more difficult to remove, since it will be surrounded by other sod rolls which are not defective.

If the defective sod roll is removed before it reaches the sod roll storage area, then a problem arises with how to dispose of the defective roll. It is not practical to store the defective rolls on the harvester, since space there is limited. If a defective roll is disposed of on the ground, it may interfere with subsequent passes of the sod harvester.

BRIEF SUMMARY OF THE INVENTION

It is therefore an object of the invention, in one of its aspects, to provide a sod harvester adapted for travel along a path of travel in a sod field, said harvester having;

(a) a cutting head for producing cut sod from said field and thereby producing a cut area in said field, and for leaving in said field an uncut area from which sod has not yet been cut;

(b) a conveyor assembly behind said cutting head for conveying cut sod from said cutting head;

(c) a roll-up mechanism associated with said conveyor assembly for forming said cut sod into a plurality of sod rolls;

(d) a sod roll storage receiver adjacent said conveyor assembly for receiving a plurality of said sod rolls;

(e) a diverter mechanism between said conveyor assembly and said storage receiver and moveable between a first position in which said diverter mechanism allows sod to travel from said conveyor assembly to said storage receiver, and a second position in which said diverter diverts sod to be rejected away from said storage receiver; and (f) a deflector for deflecting said sod to be rejected away from said uncut area and onto said cut area in a position such that sod which has been rejected will not interfere with the next pass of said harvester.

In another aspect, the invention provides a method of harvesting sod in a sod field with a harvester having a cutting head and heels, said method comprising:

(a) cutting a strip of said sod and forming said strip into a roll, leaving a cut portion in said field;

(b) conveying said roll onto a storage receiver;

(c) causing a defective piece of sod to fall through a gap before it reaches said storage receiver; and (d) deflecting said defective piece of sod onto the cut portion of said field in a position in which said defective piece of sod will not interfere with said cutting head or wheels on the next pass of said harvester.

Figure 1:
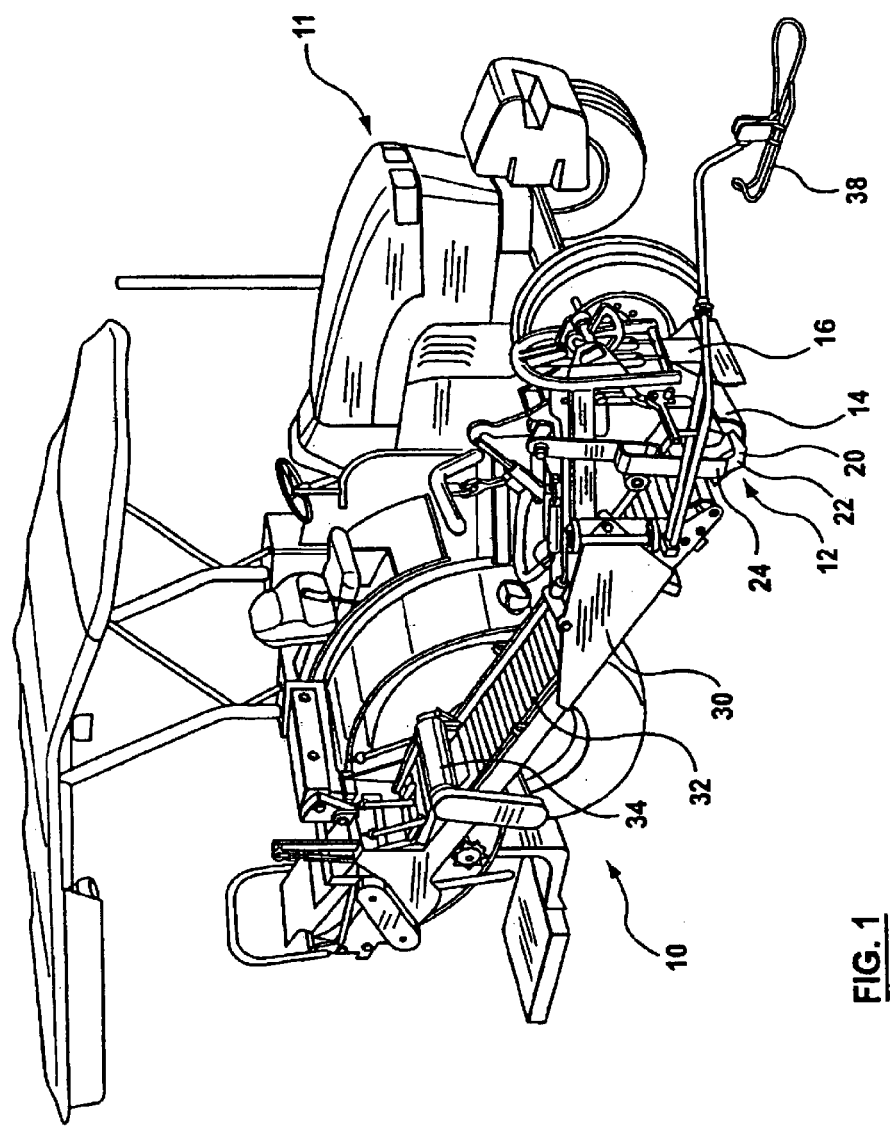
Figure 2D:
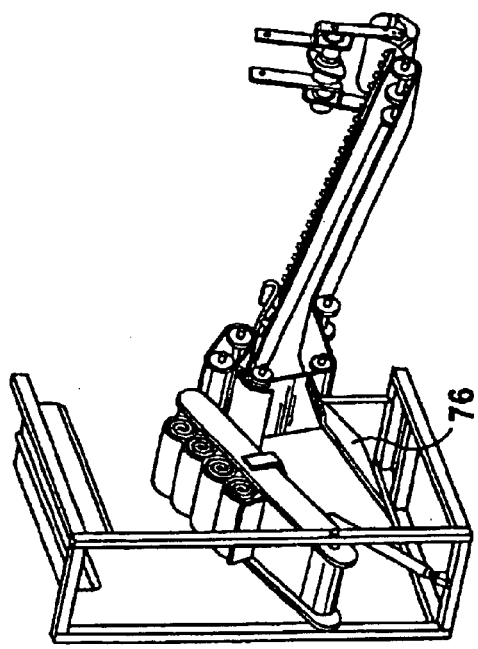
Figure 2C:
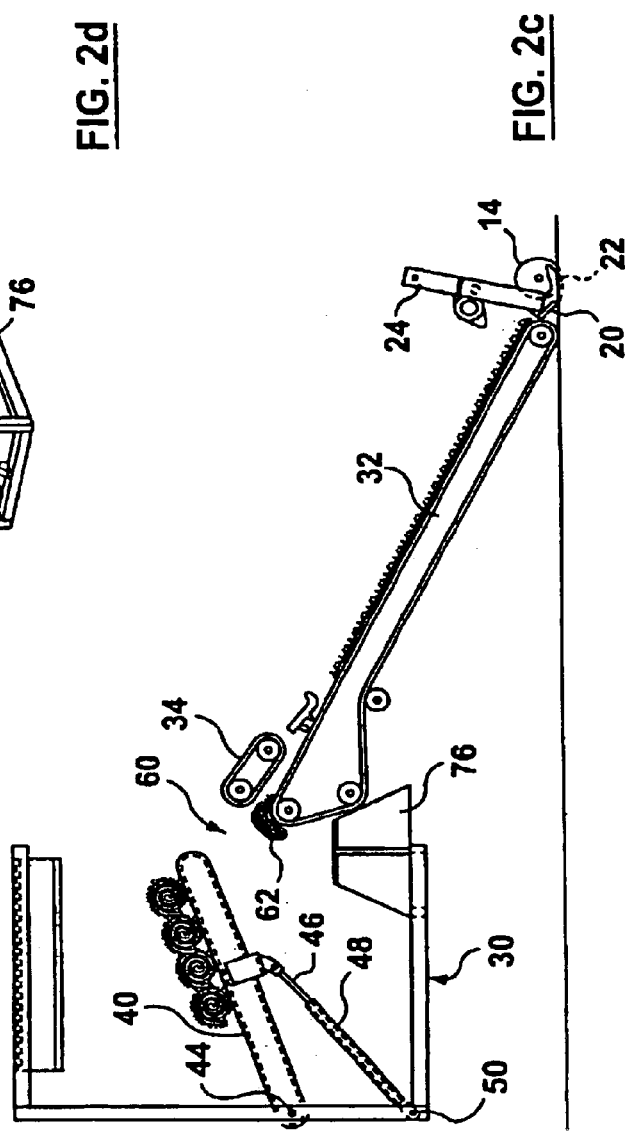
Figure 3:
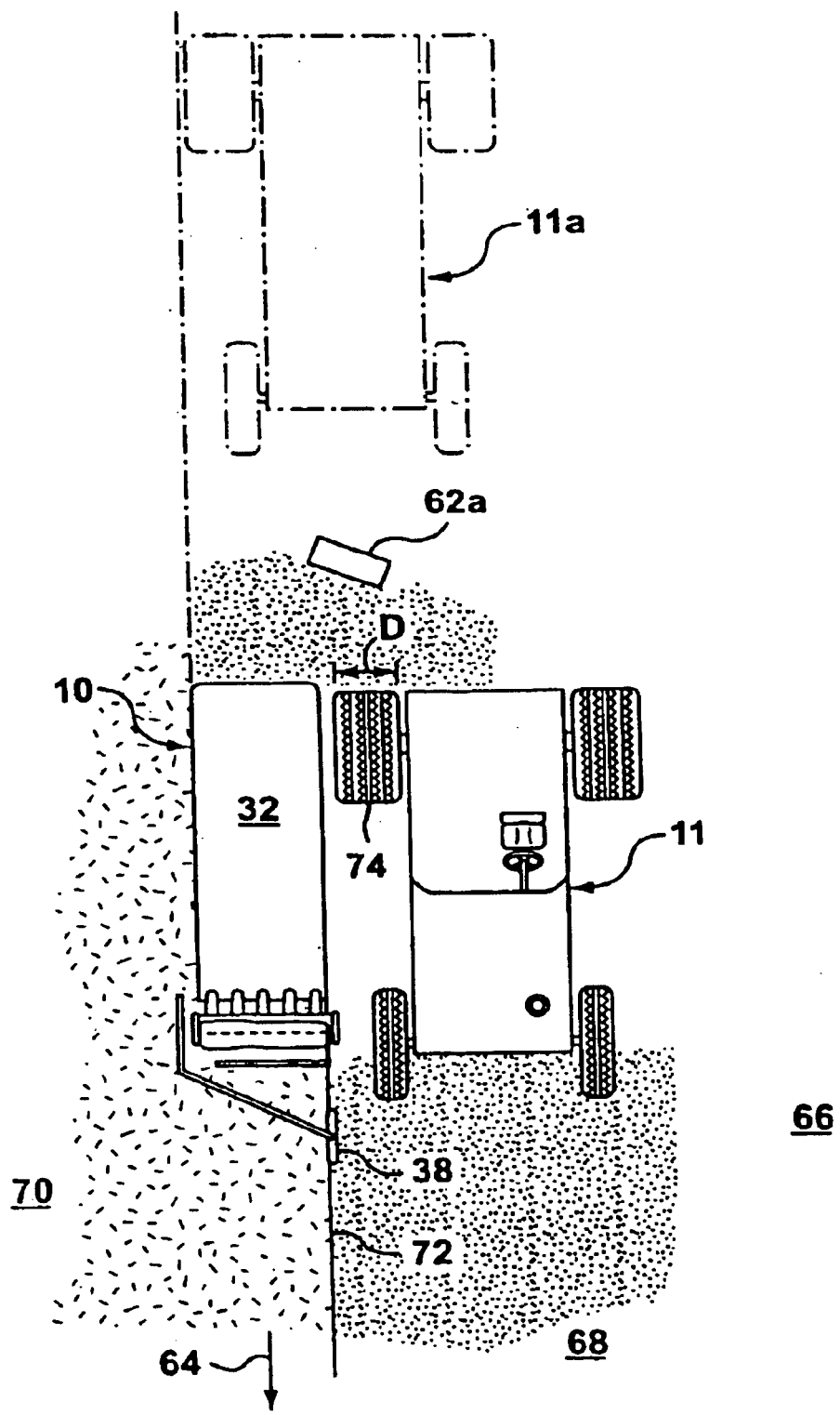
Figure 4D:
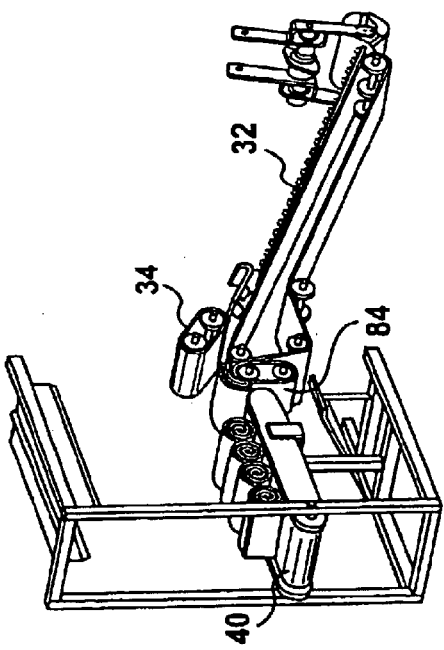
Figure 4C:
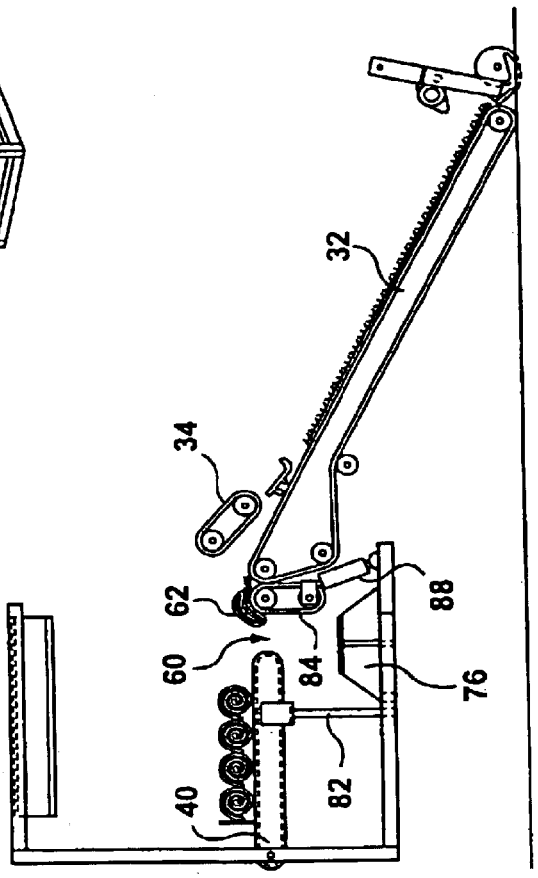

Further objects and advantages of the invention will appear from the following description, taken together with the accompanying drawings, in which:

FIG. 1 is a perspective view of a typical prior art sod harvester;

FIGS. 2(a) to 2(d) are views of a defective sod roll rejector and deflector of the invention;

FIG. 3 is a top plan view of a sod harvester according to the invention and located in a sod field being cut, showing the positioning of a rejected sod roll;

FIGS. 4(a) to 4(d) are views of another embodiment of a defective sod roll rejector and deflector according to the invention;

FIGS. 5(a) to 5(d) are views of another embodiment of a defective sod roll rejector and deflector according to the invention;

FIGS. 6(a) to 6(d) are views of another embodiment of a defective sod roll rejector and deflector according to the invention; and FIGS. 7(a) to 7(d) are views of another embodiment of a defective sod roll rejector and deflector according to the invention.

DETAILED DESCRIPTION OF PREFERRED EMBODIMENTS

Sod harvesters may be attached to a tractor for propulsion, or may be self-propelled. FIG. 1 illustrates a typical prior art sod harvester 10 such as that produced by the present applicant, Kesmac Inc. of Keswick, Ontario, Canada, for attachment to a tractor 11. However, the invention is equally applicable to a self-propelled sod harvester, such as that shown in U.S. pat. No. 4,966,239.

The sod harvester 10 includes a cutting head 12 containing a conventional ground roller 14 located behind a conventional cross cut blade 16. The cross cut blade 16 is driven downwardly at periodic intervals (by a conventional mechanism 18) to form a transverse cut in the ground, so that the strip of sod which is to be cut by the cutting head 12 will be cut in lengths, each of which can be formed into a roll.

The strip of sod to be cut travels beneath the roller 14 and is then undercut by a conventional undercutting knife 20, which includes side cutting blades 22, one at each side thereof. The undercutting knife 20 is mounted on arms 24 which are reciprocated forwardly and rearwardly in conventional fashion by a hydraulic motor (not shown), to cut a strip of sod.

The cutting head 12 is mounted on a conveyor frame 30 which extends rearwardly from the cutting head. A main conveyor 32 is mounted in the conveyor frame 30 and carries cut sod rearwardly and upwardly from the undercutting knife 20, to a sod roll-up mechanism (in the prior art harvester shown) 34 where the sod is rolled. The sod rolls are then delivered (in the prior art harvester shown) to a location where the operator can manually place the roll on a pallet (not shown) carried by the harvester.

The harvester 10 is automatically steered or guided by an auto-steer shoe 38, which follows the cut edge of the sod in the field being cut and actuates the hydraulic steering mechanism of the tractor 11. This is well-known in the industry.

FIGS. 2(*a*), 2(*b*), 2(*c*) and 2(*d*) show diagrammatically a mechanism for use on a sod harvester in which the sod rolls are as mentioned accumulated in a group for delivery to a pallet. As shown, the sod rolls 36 are delivered by the main conveyor 32 to a storage conveyor 40, similar to the arrangement shown in U.S. pat. No. 4,966,239. (The main conveyor 32 and storage conveyor 40 are located on a sod harvester which for clarity is not shown in FIGS. 2(*a*) to 2(*d*)). When the desired number of sod rolls, shown here as five rolls, have been accumulated as a set on storage conveyor 40, they are lifted and moved by a sod clamp 42 to a pallet (not shown).

Once a sod roll 36 reaches the storage conveyor 40, such roll can be difficult to remove from that location, since it abuts tightly with at least one adjacent roll and may be sandwiched between two adjacent rolls, one on each side. Therefore, defective sod rolls (also called scrap) should be removed before they reach the storage conveyor 40.

In the FIGS. 2(*a*) to (2(*d*) arrangement, this is accomplished by locating the rear end of the storage conveyor 40 on a pivot 44, and mounting the storage conveyor 40 on the piston rod 46 of a hydraulic cylinder 48. The cylinder 48 is pivoted at 50 to the conveyor frame 30, while the piston rod is pivoted at 52 to a frame 54 of the storage conveyor 40.

With the arrangement thus described, if the operator observes defective sod coming up the main conveyor 32 or a defective sod roll being formed by the roll-up mechanism 34, then the operator actuates cylinder 48 (by a control, not shown) to tilt the storage conveyor 40 upwardly as shown in FIG. 2(*c*). This forms a gap 60 between the end 40*a* of the storage conveyor 40 and the main conveyor 32, allowing the defective sod roll, shown at 62, to fall through such gap.

An important feature of the invention is that the rejected and defective roll of sod should not be allowed to interfere with subsequent passes of the harvester. As shown in FIG. 3, the harvester 10 travels forwardly along a path of travel 64 in a sod field 66. As the harvester cuts sod and as the sod is rolled up and placed on pallets, the field 66 becomes divided into a cut area 68 (from which the sod has been removed) and an uncut area 70 (from which the sod has not yet been cut). Then two areas are divided by a cut sod edge 72 (which the auto-steer shoe 38 tracks). It is a feature of this invention that the rejected sod roll 62 falls onto the cut area 68, and not onto the uncut area 70. In addition, the rejected sod roll 62 falls onto the cut area 68 in a location such that it will not be run over by the tractor 11 wheels, or interfere with the auto-steer shoe 38, on the next pass of the tractor 11.

To ensure that the rejected sod roll 62 does not interfere with the tractor wheels at the very time when the rejected sod roll falls to the ground, the gap 60 is positioned behind the tractor rear wheels (one of which is shown in dotted outline at 74 in FIG. 2(*b*)). However, to ensure that the rejected roll 62 does not interfere with the next pass of the harvester and tractor, the rejected roll 62 is dropped to the ground in a position such that it will be between the tractor wheels on the next pass of the tractor (and therefore will not be run over by the tractor).

This positioning of the rejected sod roll 62 in the proper location on the cut area 68 is accomplished by a deflector 76, which as shown in FIGS. 2(*a*) to 2(*d*) and 3 comprises a metal sheet mounted below the end of the main conveyor 32, to receive rejected rolls which fall through the gap 60. The deflector 76 has a sloped upper surface 78, sloping downwardly and inwardly towards the cut area 68, to deflect the rejected roll of sod onto the cut area 68.

When the harvester 10 is attached to a tractor 11 (and is not self-propelled), the dimensions and location of the deflector 76 must be made such that as mentioned, the rejected roll 62 will be between the tractor wheels in the next pass. If for example the width of sod roll being cut is 16 inches, and the width of the path (or "footprint") of the front and rear tractor wheels adjacent the harvester 10 (including any offset between the wheels), indicated by dimension D in FIG. 3, is 14 inches, then deflector 76 must deliver rejected roll 62 to a location which is at least 14 inches away from the cut sod edge 72, but which will be between the tractor wheels (which are usually three to four feet apart). This situation is illustrated in FIG. 3, where the tractor on its next pass is shown at 11*a*, and a rejected sod roll which has been deflected by deflector 76 is shown at 62*a*. It will be seen that rejected roll 62*a* lies on the cut area 68, between the tractor wheels.

If the sod harvester is self-propelled, as shown in U.S. Pat. No. 4,966,239, then the same principles apply, i.e., the deflector 76 is located and dimensioned to place the defective roll 62 on the cut area where it will be out of the path of the cutting head on the next pass of the machine, and so that roll 62 will also be out of the way of the wheels of the harvester if the wheels overlap onto the cut area 68 on the next pass.

Reference is next made to FIGS. 4(*a*) to 4(*d*), which show another embodiment of a defective sod roll rejector. In the FIGS. 4(*a*) to 4(*d*) arrangement, in which corresponding reference numerals indicate corresponding parts, the hydraulic cylinder 48 for supporting the storage conveyor 40 has been replaced by a fixed mounting 82, and an intermediate conveyor 84 has been positioned between the rear end of the main conveyor 32 and the front end of the storage conveyor 40. The front end of the intermediate conveyor 84 is mounted on a pivot (the details of which are not shown). The rear of intermediate conveyor 84 is mounted on the piston rod 86 of a cylinder 88. As best shown in FIG. 4(*c*), when the piston rod 86 is withdrawn into the cylinder 88, the rear end of the intermediate conveyor 84 pivots downwardly, discharging a rejected roll or piece of sod 62 onto the deflector 76 for placement on the proper location in the cut area 68. As before, it will be seen that the deflector 76 is positioned below the gap 60 through which the rejected sod roll or piece 62 drops when the intermediate conveyor 84 is pivoted downwardly.

The intermediate conveyor 84 can be driven by frictional engagement with main conveyor 32, or alternatively it may have a separate drive motor (not shown).

Reference is next made to FIGS. 5(*a*) to 5(*d*), which show another embodiment of the invention. Again, parts corresponding to those in FIGS. 1 to 4 have been given corresponding reference numerals. In FIG. 5, the intermediate conveyor 84 does not pivot, but instead is mounted at the top end of a vertically oriented piston rod 90 extending from a vertically oriented cylinder 92 mounted on the harvester 10. In the position shown in FIGS. 5(*a*) and 5(*b*), the intermediate conveyor 84 forms a bridge between the rear end of the main conveyor 84 and the front end of the storage conveyor 40, permitting sod rolls formed by the roll-up mechanism 34 to be delivered to the storage conveyor 40. The intermediate conveyor 54 may be driven by a separate hydraulic motor or other drive mechanism (not shown).

Figure 5D:
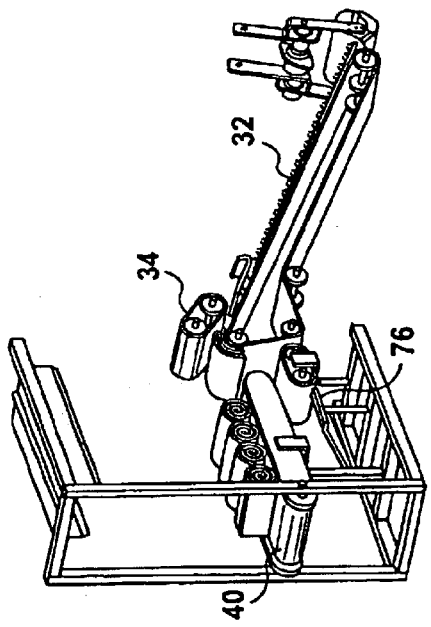
Figure 5C:
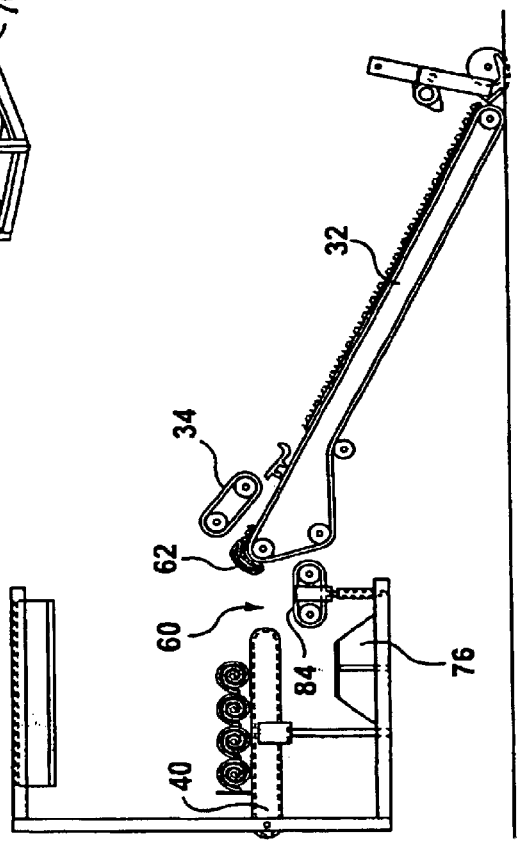

When scrap sod is to be rejected, the piston rod 90 is retracted, moving the intermediate conveyor 89 downwardly to the position shown in FIG. 5(c) and leaving a gap 60 between the main and storage conveyors 32, 40. The sod 62 to be rejected falls through the gap 60 onto the lowered intermediate conveyor 84. Because the intermediate conveyor 84 is driven, the scrap sod 62 is carried to the rear end of the intermediate conveyor 84 and is then discharged onto the deflector 76, which causes the scrap sod to be deposited onto the cut area 68 in the desired position (as explained previously).

Another embodiment of the invention is shown in FIGS. 6(a) to 6(d), in which like reference numerals indicate corresponding parts. In FIGS. 6(a) to 6(d), the storage conveyor 40 is oriented at right angles to the main conveyor 32. An intermediate conveyor 89 (driven by a hydraulic motor or other means not shown) is located between the main and storage conveyors 32, 40. The intermediate conveyor 84 is also oriented at right angles to the main conveyor 32 and is located end-to-end with the storage conveyor 40. The intermediate conveyor 84 receives formed sod rolls from the main conveyor 32 and delivers them axially (i e., they are transported in a direction parallel to their axis) onto the storage conveyor 40.

When a defective sod roll or other scrap sod 62 is to be discarded in the FIG. 6 arrangement, then the intermediate conveyor 84 is pivoted as shown in FIG. 6(b), i.e., the far end 94 of the intermediate conveyor 84 (with respect to the storage conveyor 40) is pivotally mounted so that the end 96 of the intermediate conveyor 84 which is normally adjacent the storage conveyor 40 can be pivoted downwardly as shown. (The pivoting is powered by a hydraulic cylinder, not shown.) This forms a gap 60 between the main and storage conveyors 32, 40, through which scrap sod can be discarded. A deflector 76 positioned below the gap 60 deflects the scrap sod 62 onto the cut area 68 in the proper position as previously described.

Another embodiment of the invention is shown in FIGS. 7(a) to 7(d), in which like parts have been given corresponding reference numerals. In FIGS. 7(a) to 7(d), the intermediate conveyor 84 has been replaced by a pivoting end section 100 on the main conveyor 32. The pivoting end section 100 is formed by providing appropriate pivot points in the rear rollers of the main conveyor 32. Any desired means (usually a hydraulic cylinder) may be used to actuate the pivoting of end section 100.

When a sod roll is to be rejected, the pivoting end section 100 is pivoted downwardly as shown in FIG. 7(c). The scrap sod 62 to be rejected, instead of being delivered onto the storage conveyor 40 is then discharged onto the deflector 76, from which it is deflected onto the cut portion 68 in the desired position.

While preferred embodiments of the invention have been described, it will be appreciated that changes can be made within the scope of the invention.

We claim:

1. A sod harvester adapted for travel along a path of travel in a sod field, said harvester having:
   (a) a cutting head for producing cut sod from said field and thereby producing a cut area in said field, and for leaving in said field an uncut area from which sod has not yet been cut;
   (b) a conveyor assembly behind said cutting head for conveying cut sod from said cutting head;
   (c) a roll-up mechanism associated with said conveyor assembly for forming said cut sod into a plurality of sod rolls;
   (d) a sod roll storage receiver adjacent said conveyor assembly for receiving a plurality of said sod rolls;
   (e) a diverter mechanism between said conveyor assembly and said storage receiver and moveable between a first position in which said diverter mechanism allows sod to travel from said conveyor assembly to said storage receiver, and a second position in which said diverter diverts sod to be rejected away from said storage receiver; and
   (f) a deflector for deflecting said sod to be rejected away from said uncut area and onto said cut area in a position such that sod which has been rejected will not interfere with the next pass of said harvester.

2. A sod harvester according to claim 1 wherein said deflector comprises a sheet of material positioned behind said conveyor assembly.

3. A sod harvester according to claim 2 wherein said diverter comprises an intermediate conveyor between said conveyor assembly and said storage receiver, said intermediate conveyor being moveable to produce a gap between said conveyor assembly and said storage receiver to allow sod to be rejected to fall through said gap, said deflector being positioned to receive and deflect sod which has fallen through said gap.

4. A sod harvester according to claim 3 wherein said intermediate conveyor includes a pivot, and an actuator for pivoting said intermediate conveyor to form said gap.

5. A sod harvester according to claim 3 wherein said intermediate conveyor is mounted for vertical movement between said first position and said second position, and an actuator for moving said intermediate conveyor.

6. A sod harvester according to claim 2 which said intermediate conveyor comprises a bendable section of said conveyor assembly.

7. A sod harvester according to claim 1 and having wheels, said position being located out of the way of said cutting head and said wheels on the next pass of said harvester.

8. A sod harvester according to claim 1 and supported at the side of a tractor having wheels, said position being located out of the way of said cutting head and said wheels on the next pass of said harvester.

9. A sod harvester according to claim 8 wherein said position is between said wheels on said next pass.

10. A method of harvesting sod in a sod field with a harvester having a cutting head and wheels, said method comprising:
   (a) cutting a strip of said sod and forming said strip into a roll, leaving a cut portion in said field;
   (b) conveying said roll onto a storage receiver;
   (c) causing a defective piece of sod to fall through a gap before it reaches said storage receiver; and
   (d) deflecting said defective piece of sod onto the cut portion of said field in a position in which said defective piece of sod will not interfere with said cutting head or wheels on the next pass of said harvester.

* * * * *